US007697713B1

(12) United States Patent
Verhoeven et al.

(10) Patent No.: US 7,697,713 B1
(45) Date of Patent: Apr. 13, 2010

(54) METHOD AND PROGRAM FOR PRODUCING PHOTOGRAPHS WITH AUTOGRAPHED MESSAGES WRITTEN IN CUSTOMIZED CHARACTER FONTS AND METHOD FOR DISTRIBUTING, TRANSMITTING AND PRODUCING A DIGITAL PHOTOGRAPH OF A CELEBRITY FIGURE WITH PERSONALIZED AND AUTOGRAPHED MESSAGES (75) Inventors: Denise Ward Verhoeven, Los Angeles, CA (US); Eric Ceasar Dominguez, Northridge, CA (US)

(73) Assignee: Smart & Associates, Inc., Simi Valley, CA (US)

( * ) Notice: Subject to any disclaimer, the term of this patent is extended or adjusted under 35 U.S.C. 154(b) by 1252 days.

(21) Appl. No.: 10/868,718

(22) Filed: Jun. 14, 2004

Related U.S. Application Data (63) Continuation-in-part of application No. 10/229,545, filed on Aug. 27, 2002, now Pat. No. 6,907,131.

(51) Int. Cl.
*G06K 9/00* (2006.01)
*A63F 9/24* (2006.01)

(52) U.S. Cl. ............... 382/100; 382/119; 382/305; 463/1

(58) Field of Classification Search ............ 382/100, 382/119, 181, 284, 305; 283/45, 70, 74, 283/77; 355/40; 395/150; 386/124; 178/18.01; 358/1.18, 302, 537, 540; 396/313, 314; 463/1
See application file for complete search history.

(56) References Cited

U.S. PATENT DOCUMENTS

| | | | |
|---|---|---|---|
| 2,332,511 A * | 10/1943 | Glassman et al. ........... 33/18.2 |
| 5,111,512 A * | 5/1992 | Fan et al. ................... 382/122 |
| 5,327,342 A * | 7/1994 | Roy ........................... 345/467 |
| 5,328,207 A | 7/1994 | Hannah |
| 5,428,423 A | 6/1995 | Clark |
| 5,448,372 A | 9/1995 | Axman |
| 5,530,793 A | 6/1996 | Watkins |
| 5,647,017 A | 7/1997 | Smithies |
| 5,743,801 A | 4/1998 | Welander |
| 5,778,164 A | 7/1998 | Watkins |
| 5,782,598 A | 7/1998 | Salzberger |
| 5,859,652 A | 1/1999 | Silverbrook |
| 6,176,614 B1 | 1/2001 | Taylor |
| 6,250,549 B1 | 6/2001 | DeFabio |
| 6,269,366 B1 * | 7/2001 | Romano et al. ............... 707/6 |
| 6,298,154 B1 * | 10/2001 | Cok ........................... 382/186 |
| 6,425,185 B1 * | 7/2002 | Regnault et al. ............ 33/18.2 |
| 6,691,916 B2 * | 2/2004 | Noyes ........................ 235/382 |
| 7,092,116 B2 * | 8/2006 | Calaway .................... 358/1.18 |
| 7,207,476 B1 * | 4/2007 | Slate .......................... 235/375 |
| 2001/0010730 A1 | 8/2001 | Rhoads |
| 2002/0054331 A1 | 5/2002 | Takenobu |

* cited by examiner

Primary Examiner—Aaron W Carter
(74) Attorney, Agent, or Firm—Thomas I. Rozsa (57) ABSTRACT

A novel and unique method and program distributing, transmitting and producing a personalized and autographed digital photograph of a celebrity figure, comprising the steps of first assembling executable program codes with asset elements of celebrity figures including photographs and signatures, then generating a personalized and autographed digital photograph file of a selected celebrity figure with said signature, and finally transmitting said personalized and autographed celebrity digital photograph file via a suitable medium for later access, display, reproduction or further transfer.

17 Claims, 6 Drawing Sheets

METHOD AND PROGRAM FOR PRODUCING PHOTOGRAPHS WITH AUTOGRAPHED MESSAGES WRITTEN IN CUSTOMIZED CHARACTER FONTS AND METHOD FOR DISTRIBUTING, TRANSMITTING AND PRODUCING A DIGITAL PHOTOGRAPH OF A CELEBRITY FIGURE WITH PERSONALIZED AND AUTOGRAPHED MESSAGES

This Patent Application is a continuation-in-part of patent application Ser. No. 10/229,545 filed on Aug. 27, 2002 by Denise Ward Verhoeven and Eric Ceasar Dominguez, now U.S. Pat. No. 6,907,131.

BACKGROUND OF THE INVENTION

1. Field of the Invention

The present invention relates generally to the field of computer imaging technologies, and more particularly, the present invention relates to the field of a method and program of using computer technologies to produce and transmit personalized photographs in various medium.

2. Description of the Prior Art

New computer hardware and software technologies have been developed and widely used to produce customized photographs, posters and other graphic materials. The following thirteen (13) patents are pertinent to this field of art:

1. U.S. Pat. No. 5,328,207 issued to Hannah on Jul. 12, 1994 for "Autographed Photograph and Method" (hereafter "Hannah");
2. U.S. Pat. No. 5,428,423 issued to Clark on Jun. 27, 1995 for "Photographic Printed Cards and Apparatus and Method Of Making Same" (hereafter "Clark");
3. U.S. Pat. No. 5,448,372 issued to Axman on Sep. 5, 1995 for "Storage and Retrieval of Digitized Photographic Images" (hereafter "Axman");
4. U.S. Pat. No. 5,530,793 issued to Watkins on Jun. 25, 1996 for "System for Custom Imprinting A Variety of Articles with Images Obtained from A Variety of Different Sources" (hereafter the "Watkins 793");
5. U.S. Pat. No. 5,647,017 issued to Smithies on Jul. 8, 1997 for "Method and System for the Verification of Handwritten Signatures" (hereafter "Smithies");
6. U.S. Pat. No. 5,743,801 issued to Welander on Apr. 28, 1998 for "Collectable Video Sports Card" (hereafter "Welander");
7. U.S. Pat. No. 5,778,164 issued to Watkins on Jul. 7, 1998 for "System for Custom Imprinting A Variety of Articles with Images Obtained from A Variety of Different Sources" (hereafter "Watkins '164"),
8. U.S. Pat. No. 5,782,598 issued to Salzberger on Jul. 21, 1998 for "Personalized Paper Book Cover" (hereafter "Salzberger");
9. U.S. Pat. No. 5,859,652 issued to Silverbrook on Jan. 12, 1999 for "Color Video Printer and A Photo CD System with Integrated Printer" (hereafter "Silverbrook");
10. U.S. Pat. No. 6,176,614B1 issued to Taylor on Jan. 23, 2001 for "Celebrity Autograph Collector Disk System" (hereafter "Taylor");
11. U.S. Pat. No. 6,250,549B1 issued to DeFabio on Jun. 26, 2001 for "Method for Authenticating Signatures and Memorabilia Kit Employing Same" (hereafter "DeFabio");
12. United States Patent Application Publication No. US2001/0010730A1 filed by Rhoads and published on Aug. 2, 2001 for "Steganographic Messaging through Imagery" (hereafter "Rhoads"); and
13. United States Patent Application Publication No. US2002/0054331A1 filed by Takenobu and published on May 9, 2002 for "Method for Remote Printing and Sending Cards and A system for the Same" (hereafter "Takenobu").

Hanna discloses a clear sheet which has a separate signature on the sheet and which signature is related to for example a baseball player so that the signature can be placed over a picture of the baseball player. This method employs the process of obtaining a signature of the player so that the signature can be thereafter affixed to a picture of the player.

Clark discloses a method of using a personal computer and a printer to imprint messages on the back of photographs. Specifically, the method includes the step of directly imprint a message on the reverse side of a photograph so that the photographic card can be used for picture postcards for a plurality of different kinds of applications including direct mail advertising, personal greeting cards, etc.

Axman discloses a storage and retrieval method for photographing images wherein the images are digitally stored on a compact disk. A plurality of photographic images captured on a photographic recording medium are digitized for processing and subsequently displayed. The digitized images are stored on a compact disk. When the disk is inserted into a playback device such as a color TV monitor, the pictures are displayed in an upright orientation.

Watkins '793 discloses a system for producing customized images and imprinting these customized images onto a variety of different formats.

Watkins '164 discloses a method of combining a first digital generated image and a pre-stored digital image. The method includes the steps of providing a pre-stored digital image having at least one discrete predetermined location where a first digital generated image is placed, providing the first digital generated image at the at least one discrete predetermined location, and combining the first digital generated image with the pre-stored digital image such that the first digital generated image in the at least one discrete predetermined location of the pre-stored digital image forms a single merged message. By way of example, the digital generated image may be image and/or text.

Smithies discloses a process of electronically capturing a handwritten signature. The handwritten signature can relate to a document such as an electronically stored document. The image is displayed, a user signs the document electronically and the handwritten signature is electronically captured. The signature can also be transmitted through an encryption process.

Welander discloses a method and apparatus for storing and viewing sports cards on a computer. It utilizes a compact disk which it can have introductory images of the featured athlete imprinted directly on its top surface. The compact disk may further include the athlete's name, team position, team name and a reference number that are imprinted on the front side of the compact disk. The compact disk is an electronic device which resembles a sports card and has the capacity to store a video highlight sequence of the athlete depicted.

Salzberger discloses a system for producing a paper book cover having a photograph and text caption imprinted onto the back of the paper book cover. While a person who is buying a book waits, his or her picture is captured on a video camera and is scanned into a computer. The book's cover is also entered into the computer and is then edited to incorporate the picture and text of the caption. The customized cover is then printed on the store's printer. Alternatively, the paper book cover can contain locations free of text and graphics and the customer's captioned pictures are then printed onto the voids in the book cover.

Silverbrook discloses a system for viewing and storing photo images on a compact disk in various ways.

Taylor discloses a celebrity autograph collector disk system which has a picture and other information about the celebrity on one part of the disk and room on the back side of the disk for other items including a signature. The device also includes a clear plastic sleeve in which the disk can be inserted to protect the disk.

DeFabio discloses a method of electronically storing a signed photograph. It provides a memorabilia kit which offers an originally signed article with a storage media which includes a recorded video of the actual signing event, to provide a mechanism by which to verify the authenticity of the signature. The video showing that the individual is in fact signing the article authenticates that the individual actually signed the article.

Rhoads discloses an imagery system which is stenographically encoded with message data to serve a variety of purposes. As an example, a photograph can be embedded with a message that identifies a corresponding record in a database, where the database record details information relating to the photograph. Photo collages can be formed of plural photographic images, each encoded with a different stenographic message. Medical imagery can be imbedded with stenographic messages, for example, to aid in the authentification of documents.

Takenobu discloses a method of creating a card with a photograph and a customized message. In includes a system to send a card with a photograph, and to remotely create a postcard, with a photo taken by a sender, and send the postcard to any destination regardless of who is to receive it. In particular, a customer can use a photo terminal having a communication capacity connected via a computer network to the computer system at a print shop to request that the print shop remotely create and send a card with a photo on it. The image to be printed on the card and the text data, including the name and address of the recipient and the name of the sender, are transmitted from the photo terminal to the computer network and the customer which requests that the print shop remotely creates and sends the card. The computer system at the print shop receives the image sent via the computer terminal, and the order to print remotely and send the postcard. The system prints the image and the specific text data it has received on a card to create a picture postcard which it then send.

While various apparatus, methods and programs have been developed that utilize computer technologies to produce personalized photographs, currently there is no commercially available method and program that allows a user to quickly and easily print-out an autographed photograph of a celebrity figure chosen by the user with text messages written in a font resembling the handwriting of the celebrity figure.

Therefore, it is still desirable to have a quick method and easy to use program for producing a photograph of a celebrity figure selected by a fan with personalized and autographed messages printed in a font which resembles the handwriting of the celebrity figure.

It is also desirable to have a quick method and easy to use program for transmitting and distributing a photograph of a celebrity figure selected by a fan with personalized and autographed messages printed in a font which resembles the handwriting of the celebrity figure.

It is further desirable to have a quick method and easy to use program for transmitting, distributing and reproducing personalized and autographed celebrity digital photograph by and through various electromagnetic or conventional medium.

SUMMARY OF THE INVENTION

The present invention is a novel and unique method and program for quickly and easily producing a photograph of a celebrity figure selected by a fan with personalized and autographed messages printed in a "handwritten" font generated from the celebrity figure's actual handwriting samples. It is also a novel and unique method and program for transmitting, distributing and reproducing personalized and autographed celebrity digital photographs by and through various traditional and/or modern electromagnetic medium.

It is an object of the present invention to provide a method and program for quickly and easily producing a photograph of a celebrity figure selected by a fan.

It is also an object of the present invention to provide a method and program for quickly and easily producing a photograph of a celebrity figure selected by a fan with personalized and autographed messages.

It is another object of the present invention to provide a method and program for quickly and easily producing a photograph of a celebrity figure selected by a fan with personalized and autographed messages printed in a font that resembles the handwriting of the celebrity figure.

It is an additional object of the present invention to provide a method and program for quickly and easily producing a photograph of a celebrity figure selected by a fan with personalized and autographed messages printed in a "handwritten" font generated from the celebrity figure's actual handwriting samples.

It is a further object of the present invention to provide a Compact Disc Read-Only Medium (CD-ROM) or Digital Video Disc Read-Only Medium (DVD-ROM) that contains executable programs and all required databases that allow a user to use a personal computer and attached printer to quickly and easily print-out a personalized and autographed photograph of a celebrity figure selected by the user from the databases provided on the CD-ROM or DVD-ROM.

Described generally, the present invention is primarily a method and computer program for creating a CD-ROM or DVD-ROM, or other media forms usable by computers, which has on it the databases containing pictures of celebrity figures and special messages. The computer program on the CD-ROM or DVD-ROM will enable a user to type in his or her name which will appear on the printout of the photograph of a celebrity figure selected by the user. The photograph of the celebrity figure will have a message printed in a font that is generated from the celebrity figure's handwriting with the message being customized to the name of the user.

The present invention has many novel and unique features. It provides a method and program for quickly and easily producing a photograph of a celebrity figure selected by a fan with personalized and autographed messages printed in a font that is generated from the celebrity figure's actual handwriting samples and therefore closely resembles the handwriting of the celebrity figure. It also provides a compact medium in the form of a CD-ROM DVD-ROM that contains executable programs and all required databases that allow a fan to use a personal computer and attached printer to quickly and easily print-out a personalized and autographed photograph of a celebrity figure selected by the fan from the databases provided on the CD-ROM or DVD-ROM.

In addition, it is also an object of the present invention to provide a method and program for distributing and transmitting personalized and autographed celebrity digital photographs by utilizing modern electronic technologies such as through the global computer network known as the Internet or wireless telecommunication systems.

It is still another object of the present invention to provide a method and program for distributing and transmitting personalized and autographed celebrity digital photographs by and through conventional medium such as paper, pins, cup lids, etc., as well as modern electromagnetic medium such as CD-ROM, DVD-ROM, digital picture file, slide show file, screen saver file, etc.

It is still a further object of the present invention to provide a method and program for distributing and transmitting personalized and autographed celebrity digital photographs to users through various advertising venues, such as TV shows, cable or satellite programs, the Internet, email servers, etc.

Described further, the present invention is a method for distributing, transmitting and producing a digital photograph of a celebrity figure with personalized and autographed messages. The present invention method includes the steps of first creating databases containing certain asset elements of celebrity figures including photographs, signatures, and special messages, then assembling executable program codes with said asset elements into electromagnetic files, and generating a personalized and autographed digital photograph file of a selected celebrity figure, and finally transmitting said personalized and autographed celebrity digital photograph file via a suitable medium for later access, display, reproduction or further transfer.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As a brief introduction, the present invention is primarily a method for producing a CD-ROM or DVD-ROM that contains executable programs and required databases to enable a user of the CD-ROM or DVD-ROM to quickly and easily produce a photograph of a celebrity figure selected by a the user from the databases contained on the CD-ROM or DVD-ROM with personalized and autographed messages printed in a "handwritten" font which is generated from the celebrity figure's actual handwriting samples and also contained in the databases on the CD-ROM or DVD-ROM.

Figure 1:
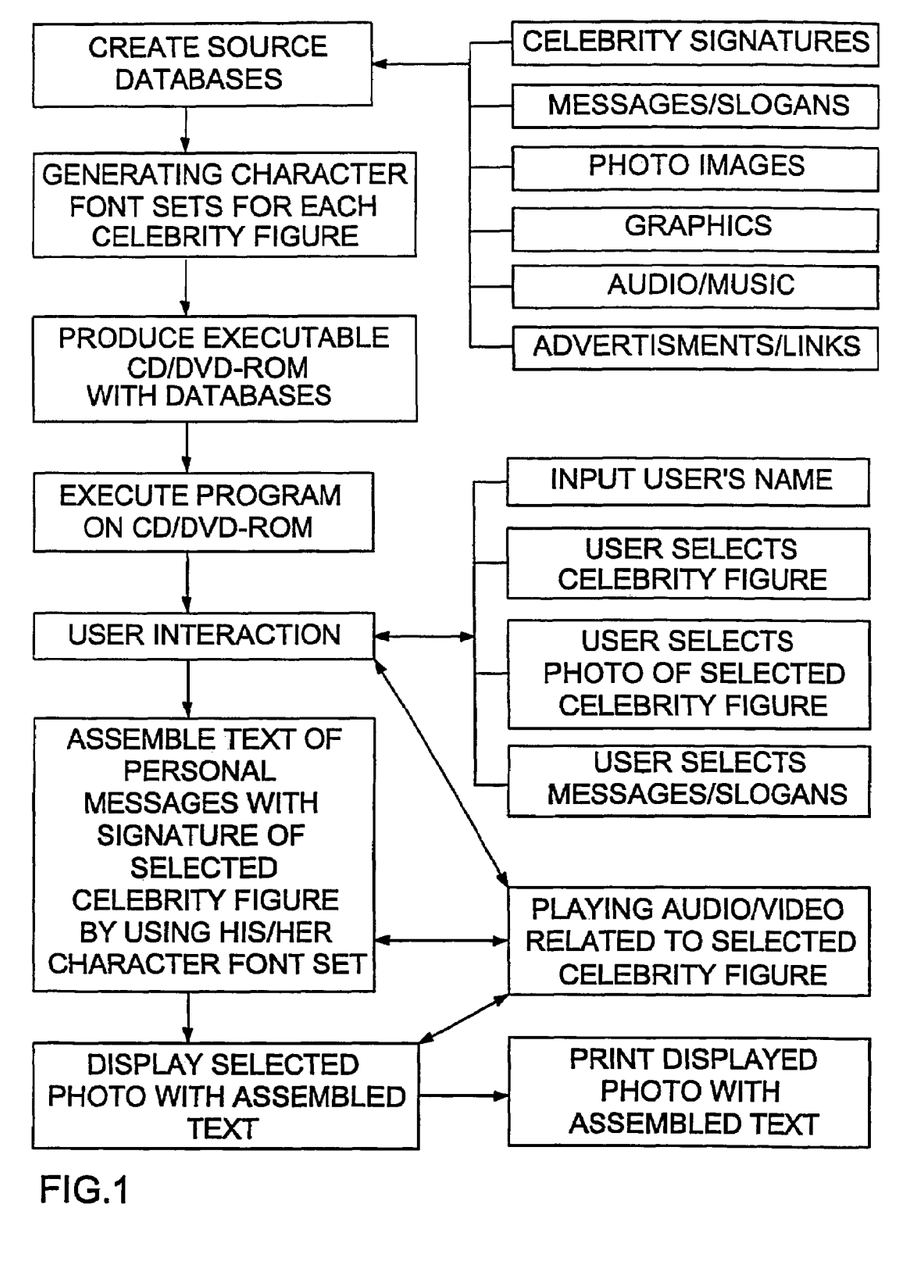
FIG. 1 is an illustrative flow chart diagram showing the logical operation of a preferred embodiment of the present method and program for producing photographs with autographed messages written in customized character fonts.
Figure 2:
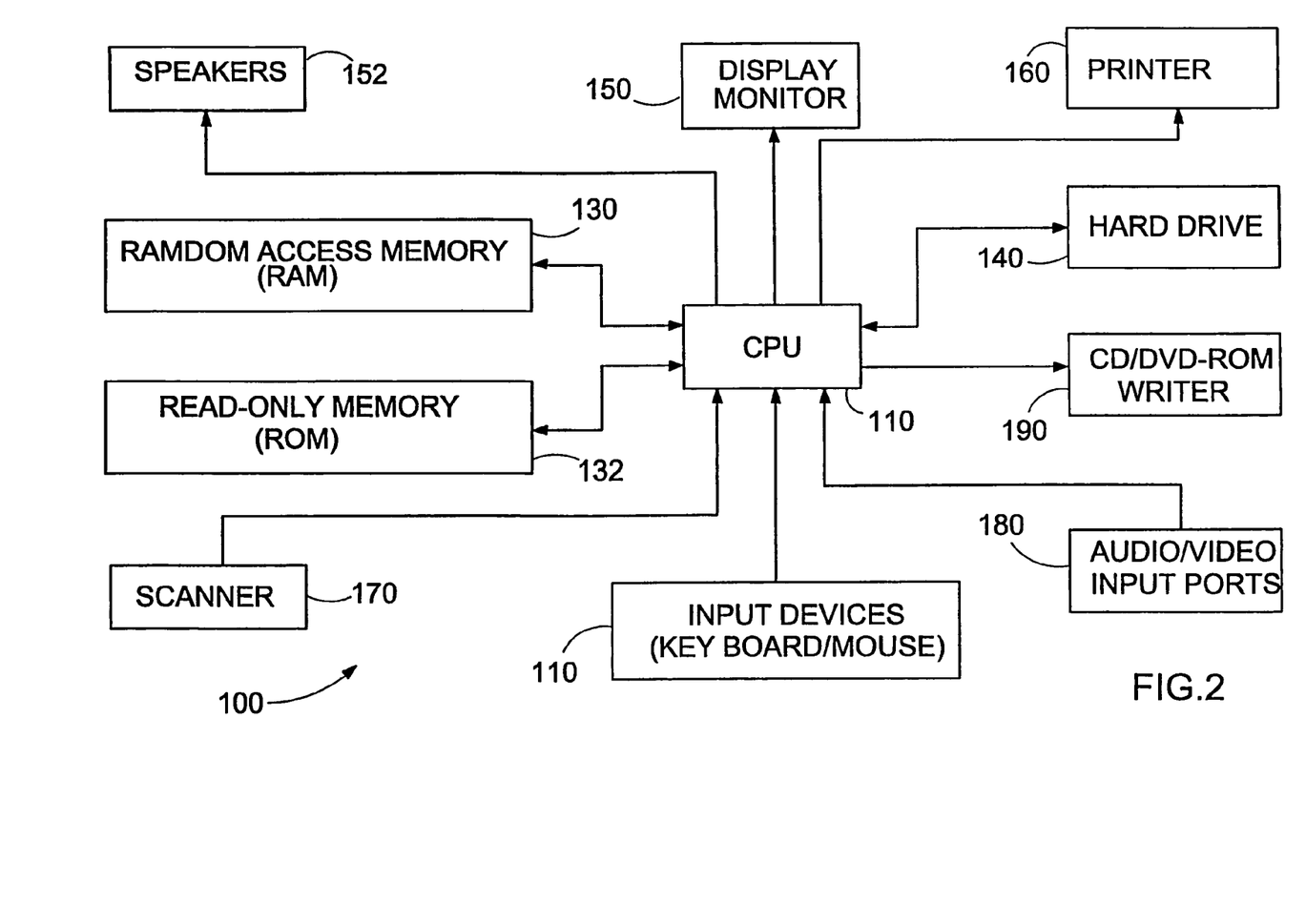
FIG. 2 is an illustrative block diagram showing the functional components of a computer system implemented for producing a CD-ROM or DVD-ROM which contains executable programs and all required databases for producing photographs with autographed messages written in customized character fonts.
Figure 3:
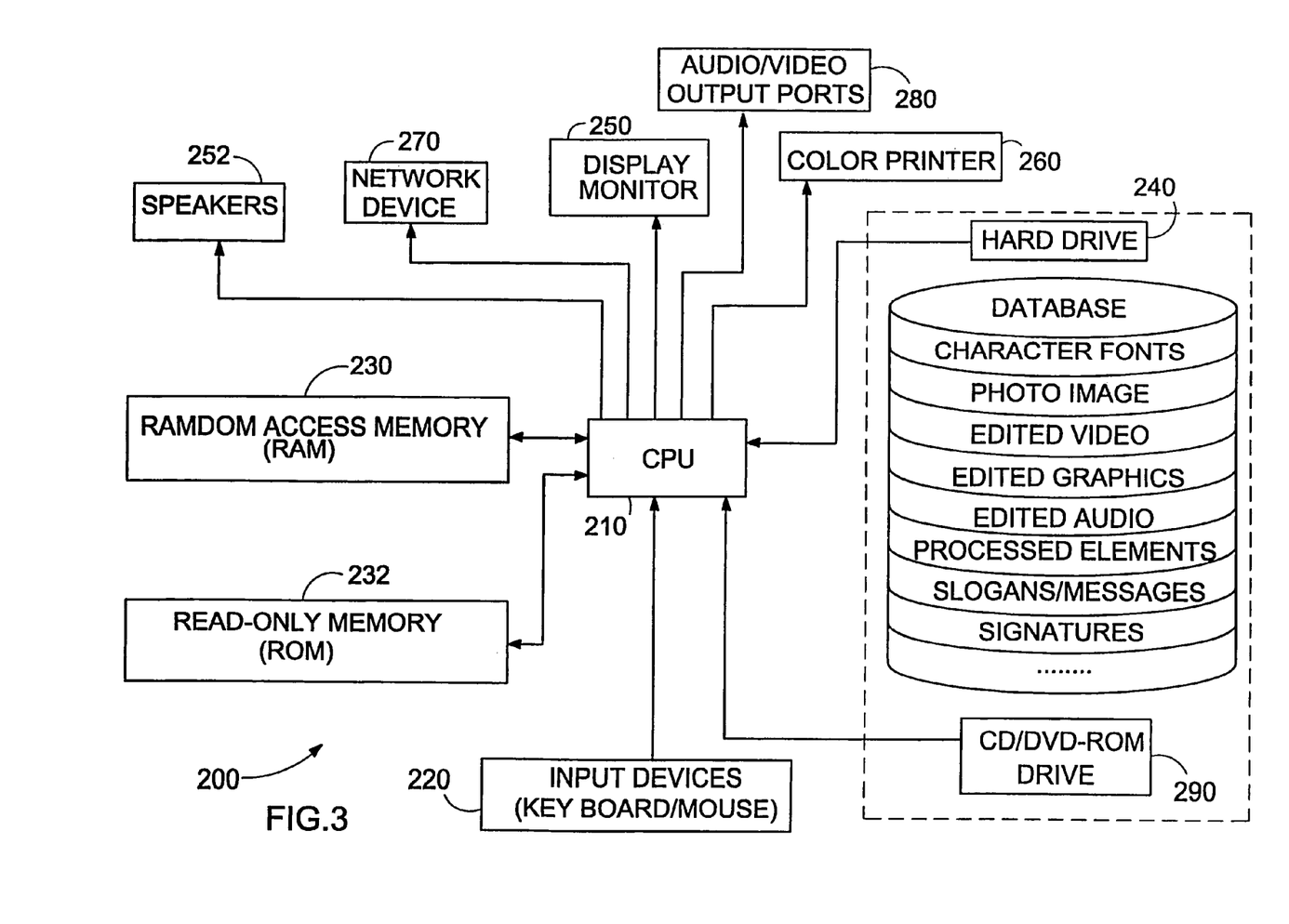
FIG. 3 is an illustrative block diagram showing the functional components of a computer system used by a user for using the CD-ROM or DVD-ROM which contains executable programs and all required databases to produce user selected photographs with autographed messages written in customized character fonts.

Referring to FIGS. 1, 2 and 3, there is shown a preferred embodiment of the present method and program for producing photographs with autographed messages written in customized character fonts. The first main step of the present invention method is to create source databases of various elements needed for producing photographs of celebrity figure's with autographed messages written in customized character fonts. In this regard, written samples, signature, photographs, audio/video clips, and other needed materials of each celebrity figure's are collected from the celebrity figures to be featured.

It is noted that the term "celebrity" is used here in general sense as it may include sports celebrities, entertainment (movie, music, etc.) celebrities, politicians, and other fictional or non-fictional figures. In the cases that the featured celebrities are real human beings, their actual written samples, signatures, photographs, audio and video clips, and other needed materials, are collected and used with their consent or permission. In the cases that the featured celebrities are fictional, literary or cartoon figures, their writing styles, "signatures", photographs, audio and video clips, and other needed materials created by their authors, are collected and used with the consent or permission of the authors or owners of such fictional, literary or cartoon figures.

The second main step of the present invention method is to generate character font sets for each featured celebrity figure. To achieve this, a computer system 100 is used.

The computer system 100 basically will have a central processing unit (CPU) 110, input devices 120 such as a keyboard and/or a mouse, memory devices such as a random access memory (RAM) 130 and a read-only memory (ROM) 132 for storing permanent and/or temporary program codes and instructions executed by the CPU 110 and/or permanent and/or temporary data to be processed by the CPU 110, mass data storage devices such as a hard disc drive 140 storing permanent and/or temporary program codes and instructions executed by the CPU 110 and/or permanent and/or temporary data and files to be processed by the CPU 110, multi-media output devices such as a video graphic display monitor 150 and audio speakers 152, and other output devices such as a color printer 160. All these components are electrically and electronically connected and coupled with the CPU 110 for performing their functions.

The computer system 100 also includes a scanner 170 or other similar device for capturing still text and graphic images from hard copies of the handwriting samples, signatures, photographs, etc., collected from the celebrity figures. In addition, the computer system 100 includes a set of audio and video input ports 180 or other similar device for capturing audio and video clips related to the celebrity figures.

The celebrity signatures, their photographs, and audio/video clips are saved in a set of database files on, for example, the hard disc drive 140. The database files may further include other data such as messages and/or slogans created, chosen or preferred by the celebrity figures, and advertisements and web site links on the worldwide computer network known as the Internet.

From the handwriting samples and signatures of the celebrity figures, the computer system can execute a program or series of programs to generate a special character font set for each featured celebrity figure.

For example, each special character font set will contain the 26 alphabetical letters, arabic numerals and special characters, so that a complete message and autograph can be composed which closely resembles the handwriting of a celebrity figure whose handwriting samples are used to generate that special character font set.

As a result, each celebrity figure to be featured will have a corresponding special character font set generated from his or her own handwriting samples and signature, which special character font set generated can be used to print a complete message and autograph which closely resembles his or her own handwriting.

Once the source databases are assembled and the character font sets are generated, the next main step of the present invention method is to produce an electromagnetic or electro-optical computer-readable medium which contains self-executable computer software programs and all required databases for allowing a user to quickly and easily produce customized and autographed photograph of the user's choosing.

The preferred computer-readable medium of the present invention is a compact disc read-only medium (CD-ROM) or a digital video disc read-only medium (DVD-ROM). This is because a CD/DVD-ROM has the desired capacity of storing a large quantity of data, is fast and reliable to use, and can be easily packaged and transported.

For this purpose the computer system 100 may include a CD/DVD-ROM writer 190 for writing the executable programs and database files onto CD-ROMs or DVD-ROMs.

Once the CD/DVD-ROMs containing the executable programs and associated databases are produced, they are sold or otherwise provided to interested users who may be fans of the sports or entertainment celebrity figures or other fictional or non-fictional characters.

A user can use the CD/DVD-ROM on his or her computer system 200. From the programs and files contained in the CD/DVD-ROM, the user can produce a photograph of a celebrity figure selected by the user with personalized and autographed messages printed in a special character font generated from the celebrity figure's actual handwriting samples.

The user's computer system 200 basically will have a CPU 210, input devices 220 such as a keyboard and/or a mouse, memory devices such as a random access memory (RAM) 230 and a read-only memory (ROM) 232 for storing permanent and/or temporary program codes and instructions executed by the CPU 210 and/or permanent and/or temporary data to be processed by the CPU 210, mass data storage devices such as a hard disc drive 240 storing permanent and/or temporary program codes and instructions executed by the CPU 110 and/or permanent and/or temporary data and files to be processed by the CPU 110, multi-media output devices such as a video graphic display monitor 250 and audio speakers 252, color graphic output devices such as a color printer 260, and network devices 270 such as a network adaptor or modem for connection to computer networks such as the Internet, and other external audio/video output ports/adapters 280 that can be used to output audio and/or video signals to other external devices such as a television (TV) set (not shown).

All these components are electrically and electronically connected and coupled with the CPU 210 for performing their functions.

The computer system 200 also includes a CD/DVD-ROM drive 290 for reading the CD/DVD-ROM containing the present invention executable programs and databases for producing a photograph of a celebrity figure selected by the user with personalized and autographed messages printed in a "handwritten" font generated from the celebrity figure's actual handwriting samples.

The CD/DVD-ROM may be produced with an "auto-run" feature that allows the program contained thereon to be executed automatically after CD/DVD-ROM is inserted into the CD/DVD-ROM drive 290.

The next main step of the present invention method for producing a photograph of a celebrity figure is to allow the user to interact with the program in multiple stages so that a personalized photograph of the celebrity chosen by the user can be printed.

To achieve this, the user is prompted and can input his or her name. The user can then select a favorite celebrity figure featured in this particular CD/DVD-ROM. Once a particular celebrity figure is selected by the user, the user is provided with a set of multiple photographs depicting the particular celebrity figure and can choose a desired photograph from the set.

As soon as the program ascertained the user's name and knows the identity of the particular celebrity figure selected by the user and the desired photograph of that particular celebrity figure selected by the user, the program will perform the next main step of the present invention method to assemble the text of a personal message from the selected celebrity figure to the user. The text of a personal message from the selected celebrity figure to the user is incorporated with the user's name with a signature of the selected celebrity figure, by using a special character font set which corresponds to the selected celebrity figure which was generated from the selected celebrity figure's own handwriting samples and signature.

The next main step of the present invention method is to display the desired photograph of the selected celebrity figure on the user's computer monitor screen with the assembled text written in the special character font set corresponding to the selected celebrity figure which was generated from the selected celebrity figure's own handwriting samples and signature and incorporating the user's own name.

After the photograph and message is confirmed by the user, a hard copy can be printed out on the color printer 260.

Figure 4:
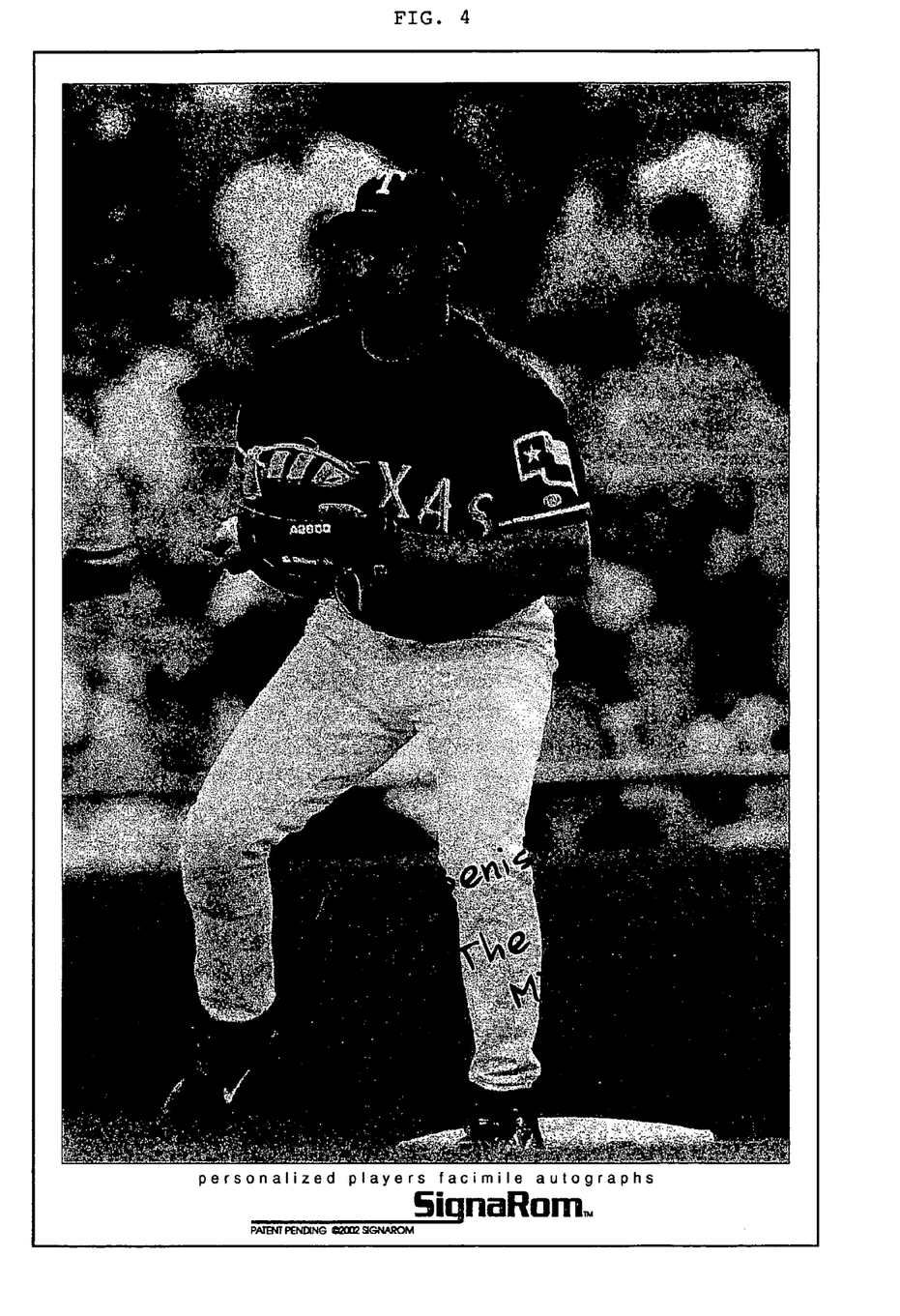
FIG. 4 is a plan view of an example of a photograph of a sports figure with autographed messages written in customized character fonts, produced by the present invention method and program.

FIG. 4 shows an example of an actual print out of a photograph of a celebrity figure, with a personalized and autographed message written in the special "handwriting" character fonts generated from the handwriting samples and signature of the celebrity figure, produced by the present invention method and program.

The present invention program may have other additional features. For example, during various stages of the execution of the program, multimedia audio/video clips or other still images, graphics, clip art and/or advertising contents may be played/displayed, and links to various web sites over the Internet may be provided.

The main advantages of the present invention is that it provides a novel and unique method and program for quickly and easily producing a desired and autographed photograph of a celebrity figure chosen by a user with customized messages printed in a special character font that is generated from the celebrity figure's actual handwriting samples and signature so that the text closely resembles the handwriting of the celebrity figure.

In addition, the present invention provides a compact and reliable medium in the form of a CD-ROM DVD-ROM that contains executable programs and all needed databases to allow a user to use a personal computer and attached printer to quickly and easily produce an autographed photograph with "handwritten" personalized message from of a celebrity figure selected by the user from the databases provided on the CD-ROM or DVD-ROM.

Figure 5:
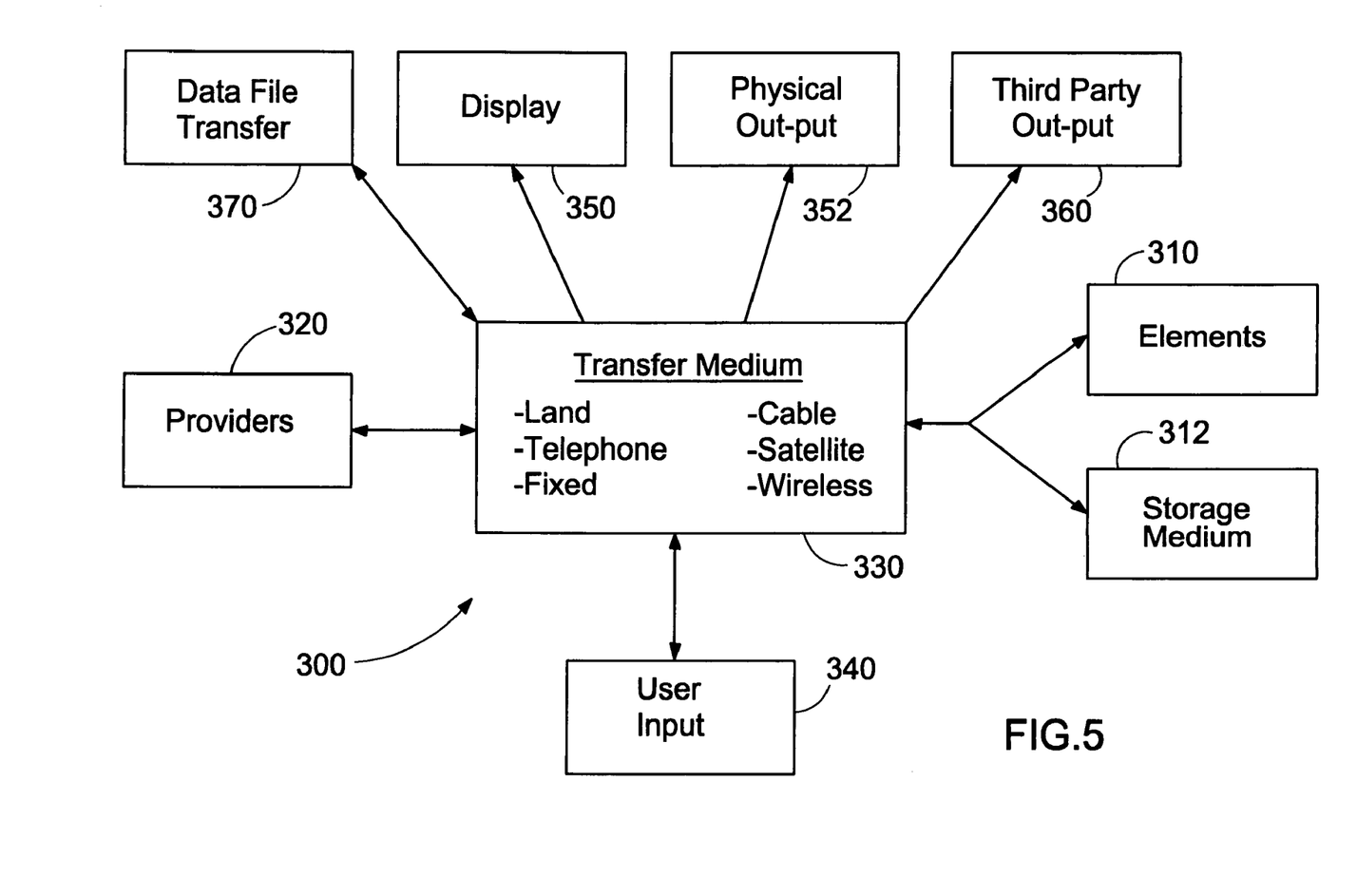
FIG. 5 is an illustrative block diagram showing the interaction of various elements in the present invention method for distributing, transmitting and producing a personalized and autographed celebrity digital photographs based on the input and selection provided by a user.
Figure 6:
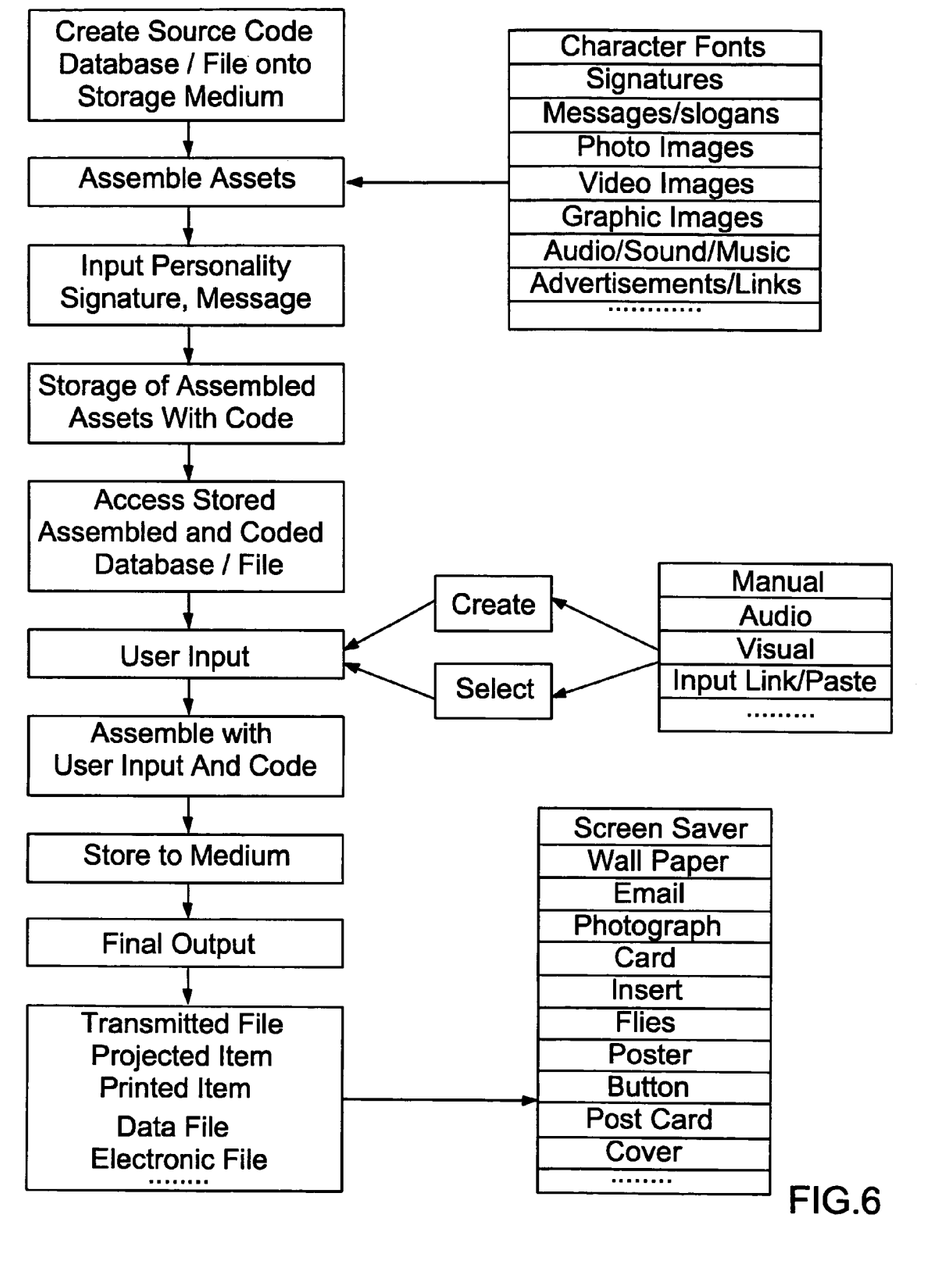
FIG. 6 is an illustrative block diagram showing the basic operations of the present invention method for distributing, transmitting and producing a personalized and autographed celebrity digital photographs.

Referring to FIGS. 5 and 6, there is shown at 300 the interaction of various elements of the present invention method for distributing, transmitting and producing a personalized and autographed celebrity digital photograph, and at 300 the basic operations of the present invention method for distributing, transmitting and producing a personalized and autographed celebrity digital photograph.

Further described, the present invention method begins with the creation of various program elements 310 such as source codes, database and files and storing them in a suitable storage medium 312. Then the assets from various providers 320 such as character fonts, celebrity signatures, celebrity messages and slogans, photo images, audio clips, sound clips, music clips, video clips, graphics, advertisement links, etc., are assembled into asset databases.

The various program and asset elements may be transmitted among the programers, content providers and users via conventional and modern transfer medium 330, such as land based communication system, telephone, fixed medium, cable, satellite, or wireless communication systems.

The celebrity signatures and messages can come from an existing asset database or from newly provided sources which can be inputted and assembled with the program codes and other assembled elements. Such assembled assets with program codes can also be stored in storage medium 312 for later access.

A user 340 can have the option of creating additional elements such as audio/video clips, personal links, etc. or select such additional elements from other existing sources and assemble them with the pre-assembled program codes and assets database/files for storage and final output.

The final output of personalized and autographed celebrity digital photographs may be shown on a display screen 350, or produced by a physical output device 352 such as a printer, or transmitted via various transfer medium 330 to the user 340 or a third party 360 as a transmitted file, or transmitted or stored as an electromagnetic data file for future access or transfer by a data file transfer system 370.

The personalized and autographed celebrity digital photographs of the present invention may be transmitted or produced in various medium or format, such as a screen saver or wall paper file, an email file, a photograph, a greeting card, an insert, a flier, a poster, a button, a post card, a cover sheet, etc.

Defined in detail, the present invention is a method for distributing, transmitting and producing a digital photograph of a celebrity figure with personalized and autographed messages, the method comprising the steps of: (a) creating databases containing certain asset elements of celebrity figures including photographs, signatures, and special messages; (b) assembling executable program codes with said asset elements into electromagnetic files; (c) allowing a user to input the user's selection of a celebrity figure; (d) generating a personalized and autographed celebrity digital photograph file according to the user's selection; and (e) transmitting said personalized and autographed celebrity digital photograph file via a suitable medium for later access, display, reproduction or further transfer.

Defined broadly, the present invention is a method for distributing, transmitting and producing a digital photograph of a celebrity figure with personalized and autographed messages, the method comprising the steps of: (a) creating databases containing certain asset elements of celebrity figures including photographs, signatures, and special messages; (b) assembling executable program codes with said asset elements into electromagnetic files; (c) generating a personalized and autographed digital photograph file of a selected celebrity figure; and (d) transmitting said personalized and autographed celebrity digital photograph file via a suitable medium for later access, display, reproduction or further transfer.

Defined more broadly, the present invention is a method for distributing, transmitting and producing a personalized and autographed digital photograph of a celebrity figure, the method comprising the steps of: (a) assembling executable program codes with asset elements of celebrity figures including photographs and signatures; (b) generating a personalized and autographed digital photograph file of a selected celebrity figure with said signature; and (c) transmitting said personalized and autographed celebrity digital photograph file via a suitable medium for later access, display, reproduction or further transfer.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A method for distributing, transmitting and producing a digital image of a celebrity figure with personalized messages and reproduced autographs of the celebrities, the method comprising the steps of:
   a. creating databases containing certain preassembled digital executable program elements including source codes and files that link respective asset elements of celebrity figures including photographs, signatures, and special messages, wherein the preassembled executable program elements are stored in a storage medium;
   b. providing an accessible transfer medium;
   c. allowing a user to send a transmission to a provider who controls the database, the user permitted to request a celebrity image and also providing the user's name; and
   e. enabling the provider to accept the user's request for celebrity image and enabling the provider to interactively access said storage medium through said transfer medium by sending asset elements to be assembled and retrieving said preassembled program elements and incorporating the celebrity image and the user's name and digitally transmitting it to the user in a fully assembled final digital file image.

2. The method in accordance with claim 1, further comprising the step of creating databases containing additional video clips, audio clips and digitalized graphic images related to said celebrity figures.

3. The method in accordance with claim 1, further comprising the step of creating databases containing advertising contents.

4. The method in accordance with claim 1, wherein said transfer medium comprises wireless and wire mediums, said wireless medium includes satellite and radio waves, and said wire medium includes the Internet including telephone lines and cables.

5. The method in accordance with claim 1, further comprising the step of generating respective corresponding special character font sets for said celebrity figures from their writing samples.

6. The method in accordance with claim 2, further comprising the step of creating digital executable computer software programs for photographs of the respective celebrity figures with said respective personalized messages and reproduced autographs of the celebrity written in respective character font sets corresponding to the respective celebrity figures.

7. The method in accordance with claim 2, further comprising the step of playing said audio clips related to the respective celebrity figures during display of the respective personalized digital graphic images of the respective celebrity figures.

8. The method in accordance with claim 6, further comprising the step of playing said video clips related to the respective celebrity figures during execution of said digital executed computer software programs.

9. A method for distributing, transmitting and producing a digital image of a celebrity figure with personalized messages and reproduced autographs of the celebrities, the method comprising the steps of:

a. creating databases containing certain preassembled digital executable program elements including source codes and files that link respective asset elements of celebrities, wherein the preassembled executable program elements are stored in a storage medium;

b. providing an accessible transfer medium;

c. allowing a user to send a transmission to a provider who controls the database, the user permitted to request asset elements of a celebrity and also providing the user's name; and e. enabling the provider to accept the user's request for celebrity asset elements and enabling the provider to interactively access said storage medium through said transfer medium by sending asset elements to be assembled and retrieving said preassembled program elements and incorporating the celebrity asset elements and the user's name and digitally transmitting it to the user in a fully assembled final digital file image.

10. The method in accordance with claim 9 wherein the asset elements of a celebrity include photographs of a celebrity figure, signatures and special messages from the celebrity.

11. The method in accordance with claim 9, further comprising the step of creating databases containing additional video clips, audio clips and digital graphic images related to said celebrity figures.

12. The method in accordance with claim 9, further comprising the step of creating databases containing advertising contents.

13. The method in accordance with claim 9, wherein said transfer medium comprises wireless and wire mediums, said wireless medium includes satellite and radio waves, and said wire medium includes the Internet including telephone lines and cables.

14. The method in accordance with claim 9, further comprising the step of generating respective corresponding special character font sets for said celebrity figures from their writing samples.

15. The method in accordance with claim 11, further comprising the step of creating digital executable computer software programs for photographs of the respective celebrity figures with said respective personalized and reproduced autographs of celebrity messages written in respective character font sets corresponding to the respective celebrity figures.

16. The method in accordance with claim 11, further comprising the step of playing said audio clips related to the respective celebrity figures during display of the respective personalized digital graphic images of the respective celebrity figures.

17. The method in accordance with claim 16, further comprising the step of playing said video clips related to the respective celebrity figures during execution of said digital executed computer software programs.

* * * * *